(12) United States Patent
Ogasawara

(10) Patent No.: US 6,868,392 B1
(45) Date of Patent: Mar. 15, 2005

(54) SYSTEM AND METHOD FOR ELECTRONIC SHOPPING USING AN INTERACTIVE SHOPPING AGENT

(75) Inventor: Nobuo Ogasawara, San Diego, CA (US)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 09/350,818

(22) Filed: Jul. 9, 1999

(51) Int. Cl.$^7$ ............................................. G06F 17/60
(52) U.S. Cl. .......................................................... 705/26
(58) Field of Search .................................... 705/26, 27

(56) References Cited

U.S. PATENT DOCUMENTS

| | | | |
|---|---|---|---|
| 5,287,448 A | | 2/1994 | Nicol et al. ................... 395/159 |
| 5,710,887 A | | 1/1998 | Chelliah et al. |
| 5,727,174 A | | 3/1998 | Aparicio, IV et al. ....... 395/348 |
| 5,729,594 A | | 3/1998 | Klingman ................. 379/93.12 |
| 5,740,252 A | | 4/1998 | Minor et al. .................... 380/49 |
| 5,758,327 A | * | 5/1998 | Gardner et al. ................ 705/26 |
| 5,758,328 A | * | 5/1998 | Giovannoli .................... 705/26 |
| 5,765,138 A | | 6/1998 | Aycock et al. ................... 705/7 |
| 5,822,737 A | | 10/1998 | Ogram ......................... 705/26 |
| 5,842,178 A | * | 11/1998 | Giovannoli |
| 5,878,141 A | * | 3/1999 | Daly et al. ..................... 705/78 |
| 5,884,029 A | * | 3/1999 | Brush, II et al. |
| 5,895,454 A | * | 4/1999 | Harrington |
| 5,926,798 A | * | 7/1999 | Carter .......................... 705/26 |
| 5,940,812 A | | 8/1999 | Tengel et al. .................. 705/38 |
| 5,946,665 A | * | 8/1999 | Suzuki et al. |
| 5,983,200 A | * | 11/1999 | Slotznick |
| 6,009,413 A | * | 12/1999 | Webber et al. |
| 6,032,129 A | * | 2/2000 | Greef et al. |
| 6,035,283 A | * | 3/2000 | Rofrano |
| 6,119,101 A | * | 9/2000 | Peckover |
| 6,125,352 A | * | 9/2000 | Franklin et al. |
| 6,131,087 A | * | 10/2000 | Luke et al. |
| 6,378,075 B1 | * | 4/2002 | Goldstein et al. ............ 713/200 |
| 6,381,597 B1 | * | 4/2002 | Lin ................................ 707/4 |
| 2002/0130179 A1 | * | 9/2002 | Walker et al. ............... 235/383 |

FOREIGN PATENT DOCUMENTS

| | | | | |
|---|---|---|---|---|
| GB | 2319862 | | 6/1998 | |
| GB | 2352856 A | * | 7/2001 | ........... G06F/17/60 |
| WO | WO95/24687 | | 9/1995 | |
| WO | WO00/55787 | | 9/2000 | |
| WO | WO 01/20522 A1 | * | 3/2001 | ........... G06F/17/60 |

OTHER PUBLICATIONS

No Author, "Software for Purchasing", Purchasing, v115, n6, p49, Oct. 21, 1993. Retrieved from Dialog File: 148, Acct#:06757539.*

* cited by examiner

Primary Examiner—Jeffery A. Smith
Assistant Examiner—Naeem Hao
(74) Attorney, Agent, or Firm—Christie, Parker & Hale, LLP

(57) ABSTRACT

An electronic shopping system which utilizes an electronic shopping agent (ESA) for allowing communication between customers and retailers during Internet shopping. The ESA has access to a customer database and a retailer database. When a request for an item/service is received by the ESA from a customer, the customer profile information is retrieved from the customer database. Appropriate retailers are also selected from the retailer database. The customer profile information and customer request is bundled as a request for proposal (RFP) and forwarded to the selected retailers for servicing. The retailers, upon receipt of the RFP submit proposals to the ESA for forwarding to the requesting customer. The proposals are catered to the requesting customer's needs and preferences. The ESA may analyze the proposals and select the best proposal(s) prior to their forwarding to the requesting customer. The ESA may further provide market survey reports to the retailers based on information accumulated on the customers using the system.

18 Claims, 10 Drawing Sheets

SYSTEM AND METHOD FOR ELECTRONIC SHOPPING USING AN INTERACTIVE SHOPPING AGENT

FIELD OF THE INVENTION

The present invention relates generally to electronic shopping systems and methods, and more particularly, to a system and method of electronic shopping which utilizes an interactive electronic shopping agent for receiving merchandise and/or service requests from customers and for identifying appropriate retailers which offer the requested merchandise and/or services.

BACKGROUND OF THE INVENTION

The expansion of personal computers into homes of average consumers has also expanded the usage of the Internet by such consumers, and with it, has opened a new avenue of shopping, specifically, Internet shopping. Internet shopping, although capable of providing convenient purchasing abilities from one's home with a simple click of a mouse, also supplies numerous downfalls to electronic shopping which affects both consumers and retailers. On the consumer side, the amount of time spent searching for a Web-site offering a desired merchandise or service is highly dependent on the level of the consumer's experience and know-how of Internet shopping. The quality of such Web-site searches also depend on the individual's experience and know-how.

To the unwary and the inexperienced, Internet shopping often proves to be a time-consuming and frustrating experience. Although there are thousands of Internet shopping Web-sites that provide merchandise and/or service information in practically all areas imaginable in addition to providing on-line purchasing abilities, the consumer must first be able to locate a site that meets his or her needs. If a specific Web-site address is not known, the consumer must search for pertinent sites by means of search engines. Devising a search that will be broad enough to result in all sites capable of meeting the consumer's needs but narrow enough to eliminate irrelevant sites may be hard and almost impossible to achieve. Most often, the consumer will settle for a broad search spend considerable amounts of time reviewing and discarding irrelevant sites that have resulted from the search.

There are other downfalls to the described method of searching the Web. For instance, a consumer has no way of knowing, without doing additional time-consuming searches, whether the located site is the best one available to the consumer. Even though a separate Web-site may exist that better caters to the consumer's requirements and preferences, the consumer will not know about such site if it did not result in search conducted. Consequently, the consumer may be forced to purchase a less satisfactory merchandise from a site that the search did provide, or not purchase the product at all, to the detriment of both consumers and retailers.

If a consumer uses the Internet to simply gather information about a desired merchandise and the stores which may carry the merchandise, the searches must also result in Web-sites of retailers geographically close to the consumer. With a list of such retailers, the consumer has a choice of visiting them in person to see and try the actual merchandise before making a purchase. However, adding a geographical limitation to the search makes Internet searching even more difficult and time-consuming.

The above-described problems are amplified if the consumer wants to purchase a merchandise or service that he or she is unfamiliar with, or is not commonly purchased or inquired-about through the Internet. In such a case, even the most experienced Internet shopper may find the searching process frustrating and unfruitful.

Another drawback to Internet shopping is the lack of interaction between consumers and retailers. From the perspective of the consumer, Web-site search results are nothing more than a collection of on-line catalogs. Although a certain degree of product or service information may be provided in the sites, such information will not suffice to answer all the questions that a consumer may have. Thus, during Interent shopping, a consumer has no access to additional information and suggestions that may come from a salesperson as would normally be the case if the purchase were being done in a conventional retail environment.

The lack of interaction between customers and retailers is also a drawback when analyzed from the retailer's point of view. For instance, when a consumer has a choice between two comparable products offered by two different retailers through the Internet, it is often the price which pushes the consumer to purchase one product over the other. This may not always be true, however, if the consumer were to visit the retailers in person. The retailer selling the higher-priced product would, through its salespeople, have the opportunity to differentiate its product over a lower-priced product, and may further be able to emphasize features that will cater to the consumer's particular needs. The opportunity to provide such shopping assistance is not available in current Internet shopping.

The lack of interaction between customers and retailers also makes it difficult for retailers to understand consumer needs and demands. Although a retailer may be able to infer such needs and demands based on consumer surveys, filling out such surveys becomes a hassle and nuisance to the consumer. Another problem due to the lack of interaction is that retailers have no way of knowing the demographics, gender, age, and preferences of purchasers or potential purchasers of particular products when it comes to Internet shopping. Such knowledge of customer profiles may be valuable in improving consumer marketing methods, such as direct mailing, because advertising may then be targeted towards specific types of consumers.

Accordingly, there is a need for an electronic shopping system which is able to allow consumers to locate appropriate merchandise and retailers more effectively through the Internet. Such system should provide a two-way communication between consumers and retailers where merchandise and/or service requests are received from customers, and appropriate retailers which offer the requested merchandise and/or services identified and passed along to the requesting customers. A request should be transmitted to the identified retailers for a proposal of items matching the request from the customer in view of the customer profile information. The proposal of items received from the retailers should then be forwarded to the consumers for their review. The consumers may then decide to make the purchase via the Internet, or visit the retailer in person to see and try the merchandise before making the purchase.

SUMMARY OF THE INVENTION

These and other objects are accomplished in accordance with the present invention by an electronic shopping system which makes use of an interactive shopping agent that provides a two-way communication between consumers and retailers for more efficient and productive electronic shopping.

In accordance with one aspect of the invention, the electronic shopping system includes at least a customer database and a retailer database. The system also includes a customer interface for receiving a merchandise/service request from a customer. An electronic shopping agent (ESA) having access to the customer database locates a customer record in the customer database corresponding to the requesting customer. The ESA further identifies all retailers from the retailer database capable of providing the merchandise/service requested by the customer. A request for proposal (RFP) is then transmitted to the identified retailers for servicing the request. The request for proposal includes the customer request and customer profile data in the located customer record.

In another aspect of the present invention, privacy protection is provided to the requesting customer by deleting the identity of the customer when generating the request for proposal.

In a further aspect of the present invention, the identified retailers generate proposals and submit them to the ESA. The proposals are then forwarded to the requesting customer. If desired, a customer may request that a recommended proposal be selected prior to the forwarding of the proposals by the ESA.

In yet another aspect of the present invention, the ESA generates a market survey report from data in the customer database. Such report is then transmitted to the retailers.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE INVENTION

Figure 1:
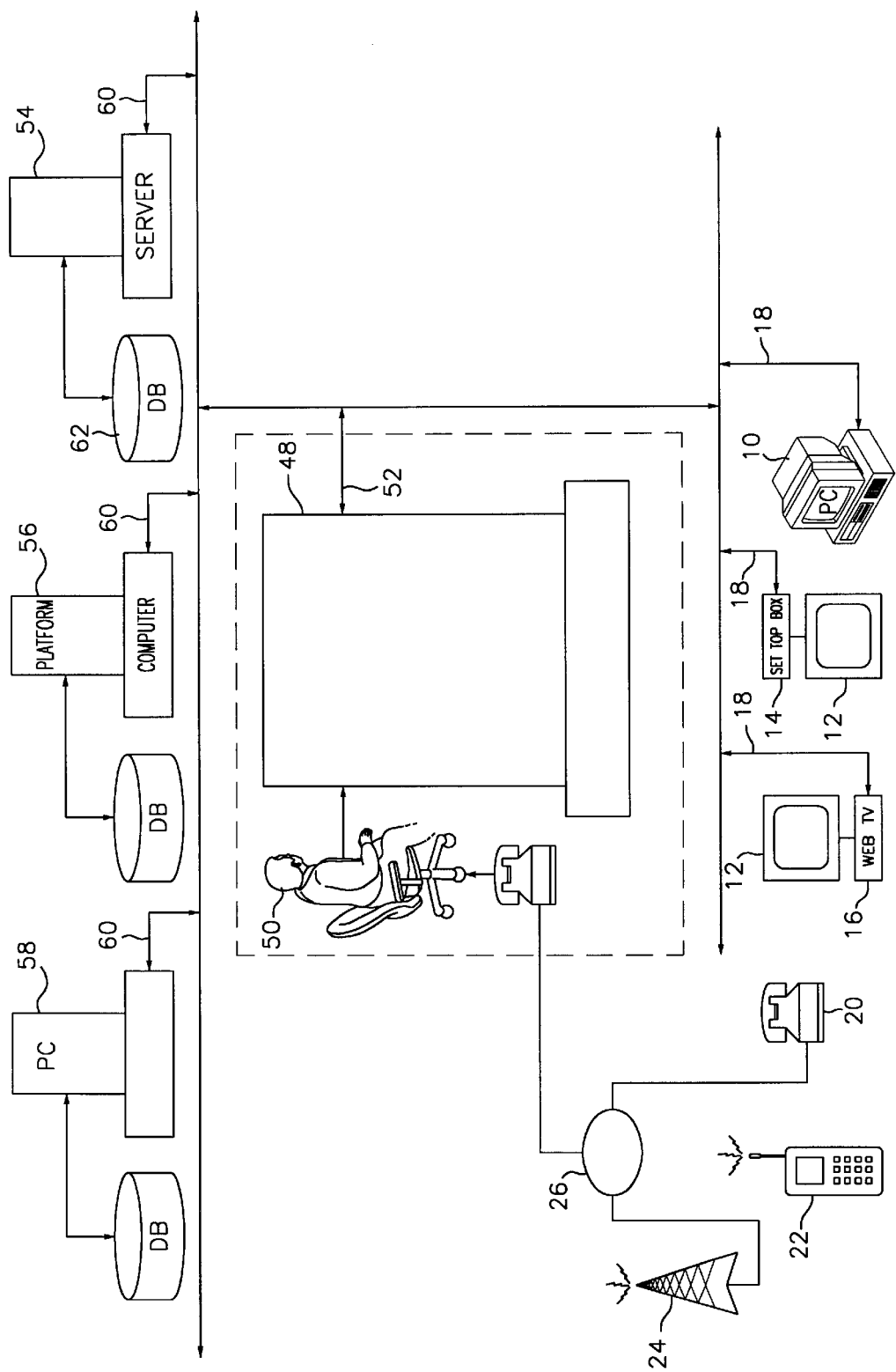
FIG. 1 is an exemplary simplified semi-schematic block diagram of an electronic shopping system including an electronic shopping agent.

In general terms, the present invention is directed to a particular system and method for establishing two-way communication between consumers and retailers during electronic shopping, specifically, shopping on the Internet. The communication instituted is similar to the two-way communication relationship between customers and vendors in a conventional retail environment. While in such conventional retail environment a customer interacts with a salesperson, a customer according to the system and method of the present invention interacts with an interactive electronic shopping agent (ESA) which in turn interacts with the retailers. The ESA receives customer merchandise and/or service requirements (purchase requirements) from the customer and identifies a number of appropriate retailers which offer the requested merchandise and/or services. The ESA, therefore, acts as a two-way communication broker between consumers and vendors.

In its most general form, the ESA is configured as a network server or a platform computer which hosts at least two databases: a Customer Database and a Retailer Database. When the ESA receives a customer request, the request is matched with customer profile data taken from the Customer Database and transferred to a Request for Proposal (RFP) engine. In the RFP engine, the ESA identifies appropriate retailers offering the requested goods or services from the Retailer Database. Once appropriate retailers are identified, the customer's purchase requests and profile information are bundled as an RFP and directed to the identified retailers for servicing. This information, in order to provide privacy to the customer, may be transmitted without disclosing the customer's name.

Upon receipt of an RFP, the retailers select items or services to recommend upon reflection of the particular customer request and profile information. The selected items or services are transmitted to the ESA in the form of proposals. The proposals include merchandise information such as the name of the proposed item, price, and description of the item. The proposal may also include pictures of items recommended. The submitted proposals are forwarded to the requesting customer for review. An analysis service might be optionally be provided to consumers to sort through proposals submitted by the retailers and choose the best proposal prior to their forwarding.

The ESA is also configured to generate market survey reports of consumer trends. These reports are transmitted to retailers, manufacturers, and other service organizations to aid their understanding of consumers interests and needs.

It will be appreciated that the system and method according to the present invention provide a significant improvement in the quality and efficiency of electronic shopping. The time-consuming and often unfruitful Web searches for appropriate retailers no longer become necessary. Rather, consumers are provided with retailer and merchandise information through interaction with a shopping agent. The information provided to consumers are further catered to individual needs and preferences. Retailers also benefit from the present system and method because knowledge of individual requests in conjunction with customer profile information allows them to provide appropriate shopping assistance to consumers. This helps bolster sales, Internet or otherwise, and further increases customer satisfaction about items purchased via the Internet.

Considering the foregoing summary of the features of the system and method of the present invention, FIG. 1 depicts a simplified semi-schematic block diagram of an exemplary electronic shopping system. The system comprises an ESA 48 configured to provide two-way communication between customers and retailers. The ESA 48 includes a customer interface for receiving purchase requirements from the customers. The customer interface might be the ESA's Web page, e-mail, or a customer service representative 50 with access to the ESA 48.

A customer accesses the ESA's web page or sends e-mail to the ESA 48 through an Internet connection 18. The Internet connection 18 might comprise ISDN lines, ADSL lines, DSL lines, and the like. A personal computer 10 equipped with a modem (not shown) might be used to access the Internet connection 18. Alternatively, a television 12 equipped with a digital or analog set top box 14, or a separate Internet access terminal 16, such as one sold under the trademark WEBTV® by companies such as PHILIPS-MAGNAVOX and SONY, may be used for connection to the Internet. In one embodiment, the set top box 14 or Internet access terminal 16 is equipped with a phone modem (not shown) which allows connection to the Internet through the Internet connection 18 over a telephone network. In an alternative embodiment, the set top box 14 or Internet access terminal 16 accesses the Internet through television cable or satellite delivery systems. It is to be understood, however, that the set top box 14 or Internet access terminal 16 may not be necessary if the television 12 itself has built-in software that permits connection to the Internet. Other devices may also be used to access the Internet. Thus, the description of the particular devices is exemplary and is not intended to be limiting in any sense.

Customers might also use a conventional telephone 20 which communicates with a conventional telephone network 26 or a wireless phone 22 which communicates with a cellular telephone network 24 to establish the customer interface.

If purchase requirements are to be transmitted over the Internet, the customer might log-on to the ESA's web site where he or she is instructed to provide information as to the name, item requested, and conditions desired. Such conditions may include characteristics sought in the item to be purchased, the price desired, and information as to when and where the customer wants to make the purchase. For instance, a customer desirous of buying men's shoes may provide the following information: "Name: Bob; Item: men's shoes; Price: <$100; Conditions: lightweight, non-slip sole, wide width, no shoe lace, brown, size 8; need in one week; want to try to buy at store in the Sherman Oaks Shopping Mall." The same information is alternatively transmitted through electronic mail. Otherwise, traditional communication means such as the telephone 20 or wireless phone 22 can be used to phone-in the requirements to a customer service representative 50 who inputs the information into the ESA 48.

The ESA 48, which is also suitably configured with an Internet connection 52, transmits the purchase requirements along with customer profile information to selected retailers, and further receives proposals of items from those retailers as described in further detail below. The proposals are then forwarded to the requesting customers.

The retailers are equipped with network servers 54, platform computers 56, or personal computers 58 with an Internet connection 60 to receive requests and profile information from the ESA 48. Any of the Internet connection methods described above in conjunction with devices accessible to customers may be employed to provide Internet access to the retailers as well as to the ESA 48. The Internet connection 60 at the retailer's site also allows a retailer to submit a proposal of items and services to the ESA 48 upon reflection of the customer requirements and profile information. Retailers may also receive market survey reports from the ESA 48 and receive merchandise and/or service orders directly from customers through the Internet connection 60.

Figure 2:
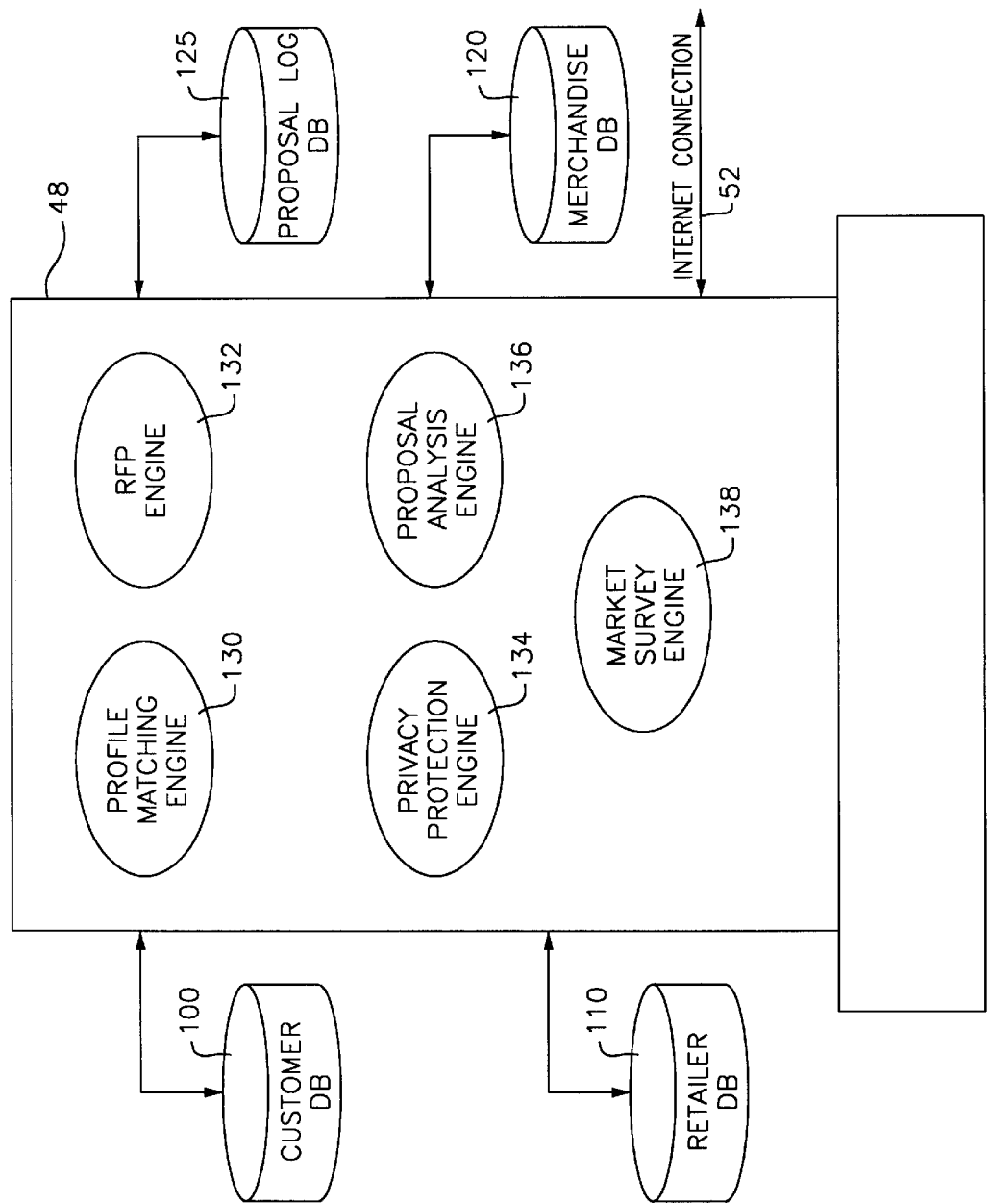
FIG. 2 is an exemplary simplified semi-schematic block diagram showing the electronic shopping agent of FIG. 1 in greater detail.

Turning now to FIG. 2, an exemplary block diagram of the ESA 48 suitable for practice according to principles of the present invention is shown in conceptual semi-schematic form. The ESA 48 might be configured as a network server or a platform computer which hosts at least two databases: a Customer Database 100 and a Retailer Database 110. In the illustrated embodiment, the two databases reside in two separate mass storage devices, each taking the form of a hard disk drive or drive array. It is noted, however, that the two databases may also reside in a single mass storage device.

Figure 3:
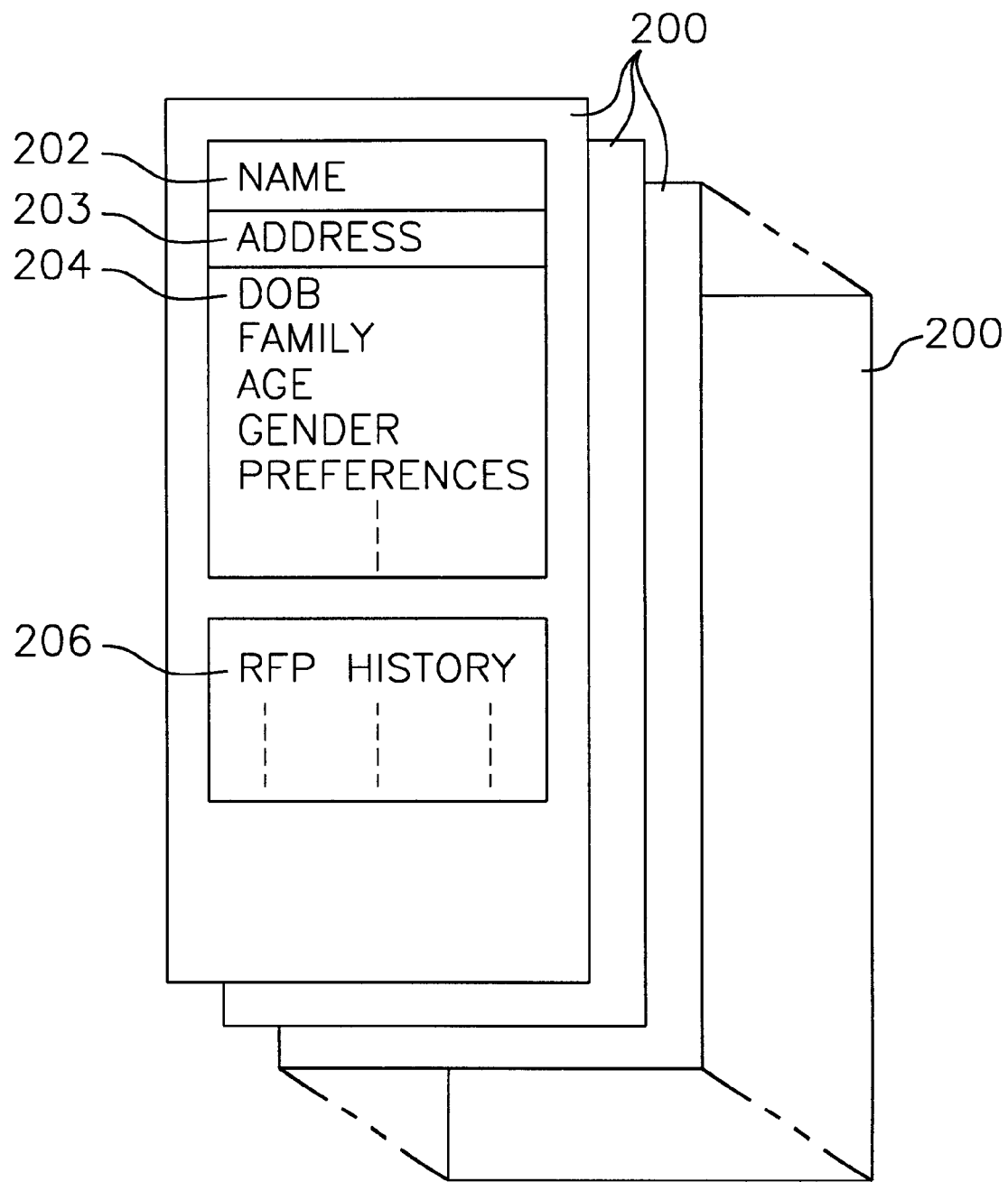
FIG. 3 is an exemplary semi-schematic, conceptual layout diagram detailing the organization of customer information in a Customer Database in communication with the electronic shopping agent.

As illustrated in FIG. 3, the Customer Database 100 comprises a series of customer specific records (identified generally at 200) each of which is headed and identified by customer name 202. Following the customer name 202, each customer data record includes the address 203 of the customer, including his or her e-mail address, and a customer profile entry 204. The customer profile entry 204 might comprise demographic information relating to the customer's date-of-birth, family status, age, gender, and the like, as well as information relating to the customer's personal shopping preferences such as preferred brands, colors, patterns, sizes, preferred retailers, etc. A retailer listed as a preferred retailer in a customer record 200 would be one of the most probable candidates for requesting a submission of a proposal. The list of preferred retailers for a particular customer is updated each time the ESA 48 identifies that the customer has purchased an item from that retailer. In an alternative embodiment, the record also includes a unique customer identification number (not shown), termed a customer ID. In addition to the foregoing, each customer record 200 includes an information storage area which contains the customer's RFP history 206. An RFP history entry might be aptly described as comprising a sequence of lists, with each list including, for example, the name and characteristics of an item requested to the ESA 48 by a customer and submitted to identified retailers for proposal. Each list further includes a pointer or some other type of logical link information to all the proposals received by the customer and stored in a Proposal Log Database 125 for matching a request with the proposals received. A description of the Proposal Log Database 125 is provided in further detail below. If the ESA 48 identifies that a certain proposal was accepted by the customer and a purchase was made, this information is also added to the list. Such information is useful in better ascertaining customer preferences for creating market research reports and identifying retailers that can cater to particular customers.

A customer record 200 is created when the customer enrolls into the electronic shopping system, or when he or she submits a request for the first time. A customer may enroll into the system over the Internet via e-mail or by logging-on to the ESA's Web-site, or by any other known communication methods. Once a customer record 200 is created, this information is used along with the customer request to create an RFP for submission to identified retailers as is discussed in further detail below.

Referring back to FIG. 2, the ESA 48 also hosts a Retailer Database 110 which includes directory of retailers with information about the merchandise or services provided by each retailer. This database might be designed as a relational, tabular, or object-oriented database. According to one embodiment, retailer information is organized based on the type of merchandise or services offered by a retailer. It is noted, however, that other organization methods may also be utilized, such as organizing alphabetically based on the retailer's name, or organizing geographically based on the retailer's zip code or city in which it is located.

Figure 4:
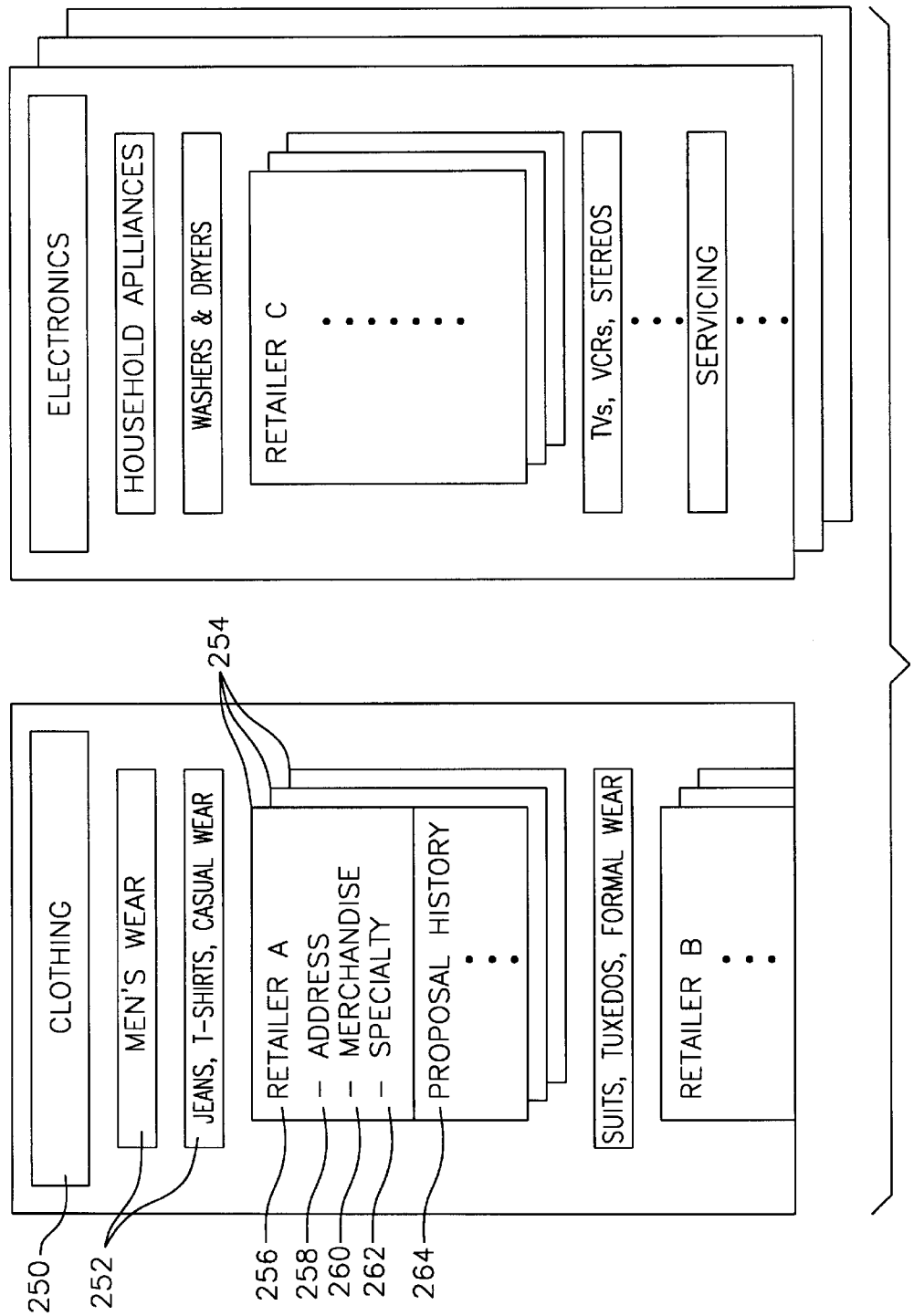
FIG. 4 is an exemplary semi-schematic, conceptual layout diagram detailing the organization of retailer information in a Retailer Database in communication with the electronic shopping agent.

FIG. 4 is a semi-schematic, conceptual layout diagram detailing the organization of the Retailer Database 110 according to one embodiment of the invention. As illustrated here, products and services offered by retailers are categorized into broad categories 250. Such broad categories 250 may include clothing, electronics, food, entertainment, etc. The broad categories 250 are further divided into one or more sub-categories 252 for further categorizing a retailer's products and/or services. A series of retailer-specific records (identified generally at 254) for a listed category or sub-category of products or services are then created for the various retailers.

Each retailer record 254 is headed by the name of the retailer 256 and includes the store's address 258, including its e-mail address, and merchandise/service information 260. In addition, each retailer's record 254 might also include the specialty 262 of the retailer, or what the retailer is generally known for. The retailer's record 254 further includes an information storage area for maintaining the proposal history 264 for the particular retailer. The proposal history 264 area might be described as containing a list of items and/or services proposed by a retailer, along with a description of such items or services. The proposal history 264 area further contains a pointer or any other type of logical link information to all the proposals submitted by the retailer and stored in the Proposal Log Database 125. The data in the Retailer Database 110 is then used to select one or more retailers that may satisfy a customer's request.

Figure 5:
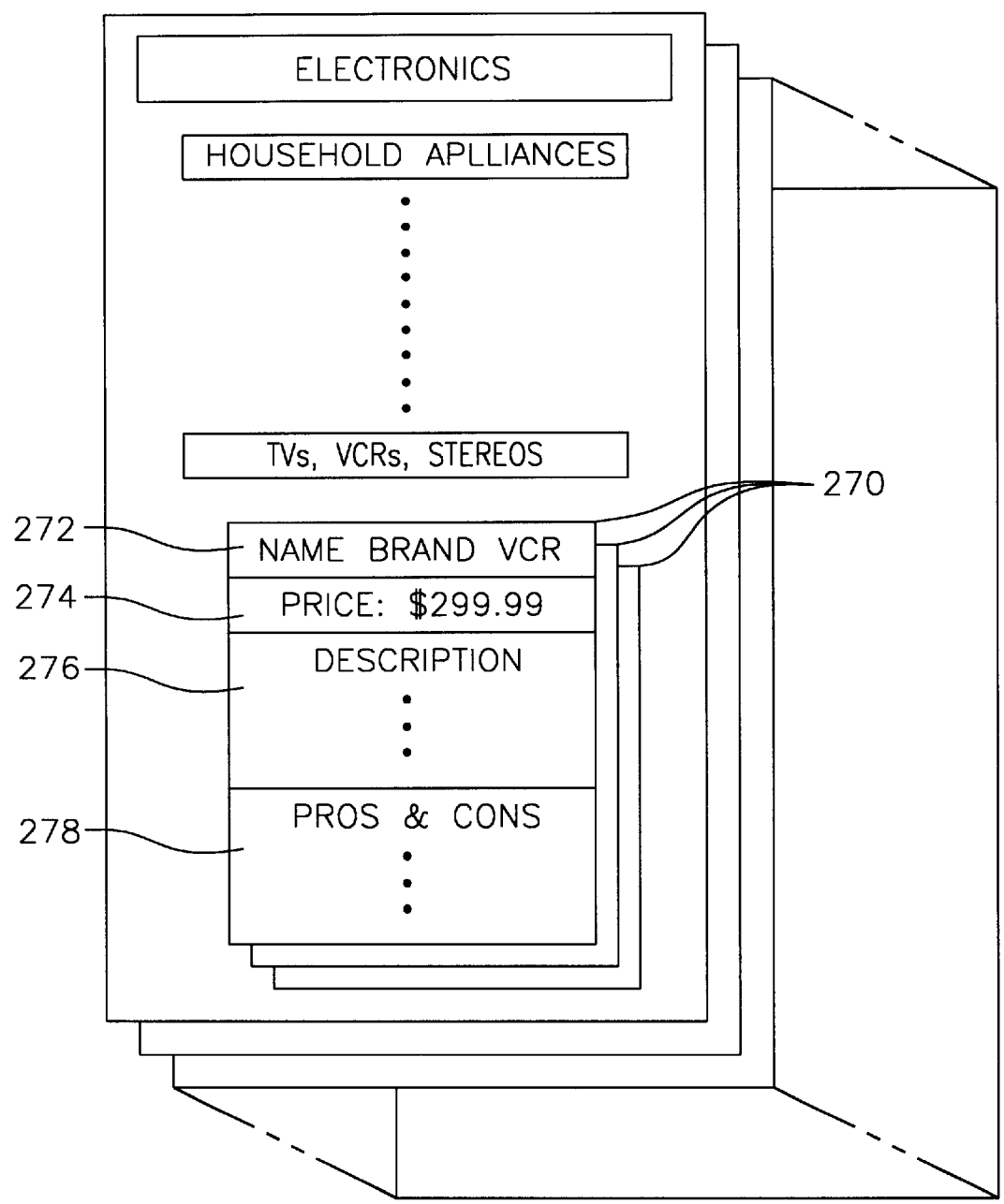
FIG. 5 is an exemplary semi-schematic, conceptual layout diagram detailing the organization of merchandise information in a Merchandise Database in communication with the electronic shopping agent.

In addition to the Customer Database 100 and the Retailer Database 110, the ESA 48 in a currently preferred embodiment also hosts a Merchandise Information Database 120 (FIG. 2). Stored in this database is merchandise and service information contained in the proposals transmitted by the retailers. FIG. 5 provides an exemplary layout of the Merchandise Information Database 120. As illustrated here, the database contains a series of merchandise (and service) records 270 organized according to the method described for the Retailer Database 110. Each merchandise record 270 includes an entry for the product's name 272 and a separate entry for the product's price 274. The price 274 entry might reflect the average price of the listed item.

Each merchandise record 270 also includes an information storage area containing a product description 276. For instance, if the record is for a particular VCR model, the product description 276 area might provide information as to whether the VCR is a two head or a four head VCR, and further provide information as to the difference between the two. In another example, a record for a particular wine might, in the product description 276 area, describe the types of food best complemented by the wine. A Pros and Cons area 278 of each merchandise record 270 provides further information about the possible benefits and drawbacks of a particular product or service. This information is transmitted to the customers upon request to aid the customers make an informed decision as to which of the proposed items to purchase.

According to a currently preferred embodiment, the ESA 48 also hosts a Proposal Log Database 125 for storing a series of raw data records of received proposals from identified retailers. The ESA 48 allows the retrieval of such records from both the Customer Database 100 and the Retailer Database 110 for better ascertaining customer preferences and appropriate retailers from whom to request proposals.

Figure 6:
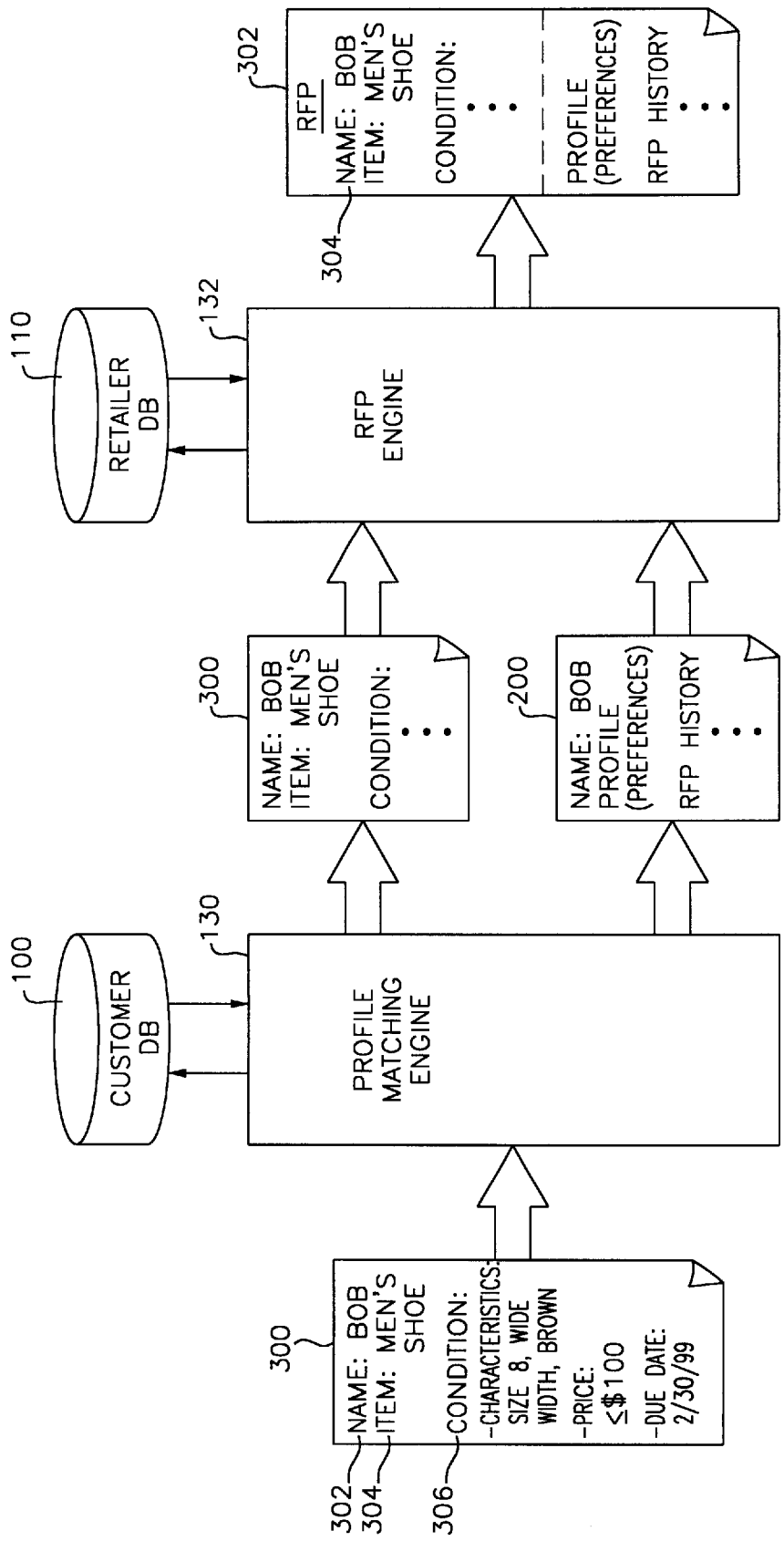
FIG. 6 is a functional block diagram of a Profile Matching Engine and an RFP Engine for the electronic shopping agent.

Referring back to FIG. 2, the ESA 48 includes a Profile Matching Engine 130 and an RFP Engine 132 for processing customer requests. As illustrated in FIG. 6, a customer's purchase request 300 including the customer's name 301 item requested 304, and conditions 306 sought (size, color, etc.) is transmitted to the Profile Matching Engine 130. The Profile Matching Engine 130 conducts a search for the requesting customer's name in the Customer Database 100 and retrieves the appropriate customer record 200 (FIG. 3) containing his or her profile data. Alternatively, if the customer ID is kept in the customer record 200 and this ID has been included in the customer's request 300, a search is conducted for the particular customer ID rather than the customer name.

No match will be found in the Customer Database 100 if the customer is not enrolled in the system. In this case, the Profile Matching Engine 130 creates a new customer record 200 for the customer with his or her profile data. The necessary data for creating the record 200 is obtained by having the customer fill-out a profile information sheet or by having the customer service representative 50 (FIG. 1) call-up the customer to obtain the information over the phone.

A copy of the customer record 200 corresponding to the requesting customer is then transmitted to an RFP Engine 132 along with the customer's purchase request 300. At about the same time, the RFP history 206 storage area in the original customer record 200 is updated to include information in the purchase request 300, and the updated record 200 is stored back into the Customer Database 100. The customer profile entry 206 of the customer record 200 may also be updated if necessary to reconcile with the purchase request 300.

Receipt of the customer record 200 along with purchase request 300 information invokes a search and retrieval subroutine in the RFP Engine 132. This subroutine enters the Retailer Database 110 and searches the category of retailer products and/or services 250, 252 (FIG. 4) for the item requested 304. Once the appropriate category of products is found, retailer records 254 within the category are searched and their merchandise 260 and specialty 262 information examined for locating the item requested 304 by the customer.

Once a plurality of suitable retailers are identified from the Retailer Database 100, the RFP Engine 132 bundles the customer's purchase request 300 with the copy of the customer record 200 to create an RFP 302 suitable for transmittal to the identified retailers over the Internet connection 52. The RFP 302 may be transmitted to the retailers by electronic mail or by other known data transmission methods.

In a typical scenario, the RFP 302 will be a concatenation of the customer request 300 and the copy of the customer record 200, headed and identified by the requesting customer's name 301. A customer, however, may not wish to reveal his or her identity to all of the retailers to whom the RFPs are to be submitted to avoid receipt of junk e-mails and other unwanted promotional efforts from the retailers. Thus, according to a preferred embodiment, the ESA 48 incorporates a Privacy Protection Engine 134 (FIG. 2) to provide privacy to the customers.

Figure 7:
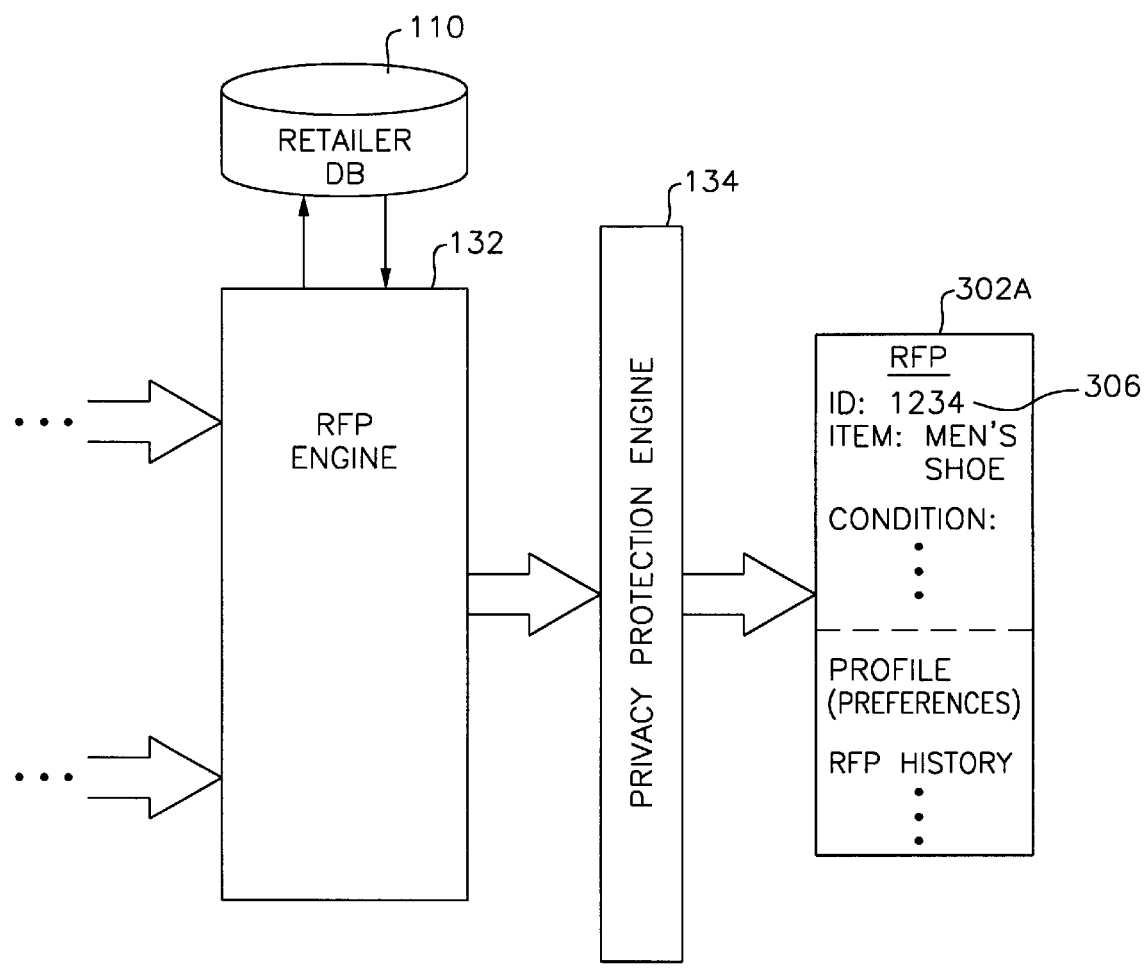
FIG. 7 is a functional block diagram of a Privacy Protection Engine in communication with the RFP Engine of FIG. 6.

FIG. 7 is a functional diagram of the Privacy Protection Engine 134 which is in communication with the RFP Engine 132. In its most elementary form, the Privacy Protection Engine 134 assigns a temporary customer ID 306 and includes the ID 306 in the RFP 302A instead of the customer's actual name. When the ESA 48 receives proposals with the temporary ID 306 from the retailers, the customer's name matching the ID 306 is retrieved from a temporary storage location for forwarding the proposals to the appropriate customer. If a customer ID is already maintained in the customer record 200 in the Customer Database 100, this permanent ID is used instead of the temporary ID 306.

The Privacy Protection Engine 134 may also be configured to provide other types of firewalls around the Customer Database 100, Retailer Database 110, and Merchandise Information Database 120. Such firewalls are desirable to ensure integrity of the data stored in those databases as well as to prevent access by unauthorized hackers.

Upon receipt of an RFP 302, 302A (referred generally as 302), the retailer prepares a proposal of items and/or services within the time specified by the customer and transmits it back to the ESA 48. In formulating the proposal, a retailer considers the customer requirements and profile data in the RFP 302. If the RFP 302 includes the customer's name, the retailer may conduct a search of its own database 62 for further information about the customer prior to the formulation of the proposal. The database 62 at the retailer's site, in addition to the profile data contained in the RFP, includes additional information about the customer, such as his or her shopping history, or whether the customer is a preferred customer participating in a preferred customer plan which might allow him or her reward points or discounted prices. The database 62 might also keep a list of proposals submitted for the particular customer. In addition, the database 62 might keep track of whether or not the proposals resulted in actual purchase.

Reflection of customer profile data and individualized requirements through the RFP 302 as well as any other additional data in the database 62 at the retailer's site allows a retailer to propose an item that will better cater to the customer's individual needs and preferences. Rendering such customer-specific proposals not only benefits the customer, but also benefits the retailer because it improves the probability of actual purchase by the customer.

Figure 8:
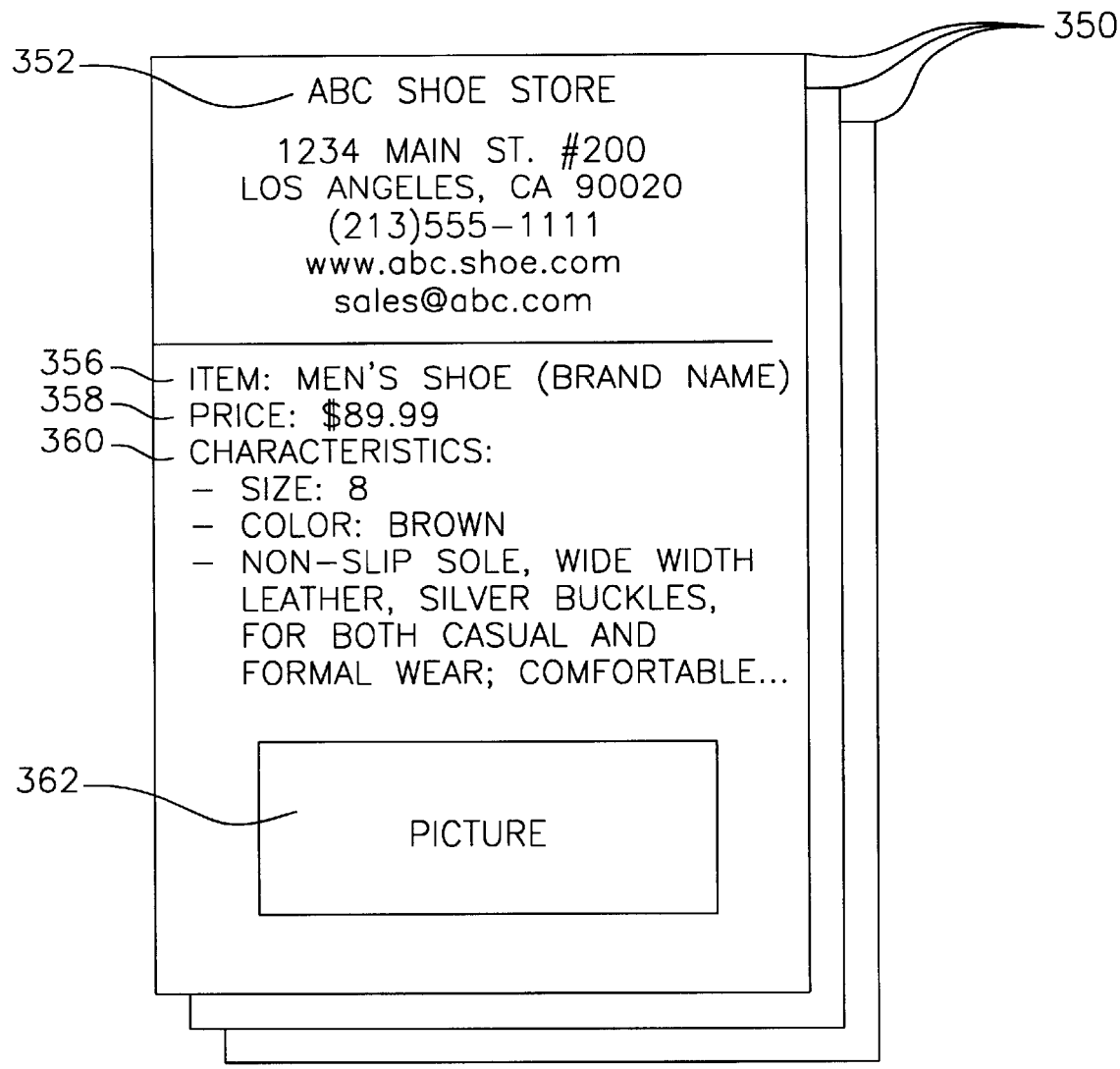
FIG. 8 is a semi-schematic, conceptual layout diagram of an exemplary proposal submitted to the electronic shopping agent by identified retailers.

FIG. 8 is an exemplary illustration of proposals received from identified retailers. The proposals 350 might be a portion of the retailer's on-line catalog or may alternatively be created from scratch by a salesperson with access to a computer. In the illustrated embodiment, each proposal contains a header section 352 with the name of the retailer followed by its physical address and telephone number. The retailer's Web-site and e-mail address might also be included if available.

Following the header section 352 is the name of the item recommended 356 along with the corresponding price 358. A description of the characteristics 360 of the item recommended then follows and includes such information as size, color, and beneficial features of the item. A picture 362 of the item can also be included if desired. A single proposal may contain a plurality of recommended items if more than one product or service from an identified retailer matches the customer's requirements and profile data.

Once a proposal is generated by a retailer, it may be stored in the retailer's database 62 (FIG. 1), if the identity of the customer is known, for use by the retailer in making recommendations in the future. The proposal is then transmitted to the ESA 48 over the Internet connection 60 via e-mail or by other known communication methods. The customer's name (or the temporary or permanent ID assigned) is also transmitted with the proposal for allowing the ESA 48 to forward the proposal to the requesting customer.

Referring back to FIG. 2, the RFP Engine 132 within the ESA 48 receives the proposals of suggested merchandise or services from the identified retailers. Upon receipt of the proposals along with the customer name or ID, the proposals are bundled into a single record and electronically transmitted to the customer identified by the name or ID. In addition, merchandise information contained in the proposals 350, such as the price 358 of the item, item characteristics 360, and picture 362, are extracted from the proposals 350 and stored in the Merchandise Information Database 120.

Information in each proposal 350 is also stored in the Proposal Log Database 125. A pointer to each proposal record stored in the Proposal Log Database 125 is stored in the RFP history 206 (FIG. 3) area of the corresponding customer record 200 in the Customer Database 100. Logical link information to each proposal record is also stored in the proposal history 264 (FIG. 4) area of the corresponding retailer record 254 in the Retailer Database 110, and serves as a method of accumulating information about items carried by the retailers. Information in each proposal 350 might also be stored in the proposal history 264 area of the corresponding retailer record 254. The accumulation of such information helps improve the accuracy of finding appropriate retailers in future searches.

According to one embodiment of the invention, the ESA 48 further includes a Proposal Analysis Engine 136 (FIG. 2) for providing analysis of proposals submitted by the identified retailers. For any single request, tens or hundreds of proposals might be submitted depending on the item or service requested. When such proposals are forwarded directly to the requesting customer, the job of sorting through the proposals and determining which of recommended items and retailers best suits his or her needs and preferences rests entirely on the customer. Therefore, in those instances, the customer may want the proposals to be further narrowed by the ESA 48. The ESA 48 may do this by identifying the best proposals prior to their submission to the customer.

Even if the proposals received are not extensive in number, it may still be difficult for some customers to determine the most preferable merchandise if he or she has limited knowledge about the proposed items or services. For example, a customer in search for a vacuum cleaner might receive proposals for vacuum cleaners of various brands with various cleaning effectiveness values measured in Amps. One retailer may propose Name Brand A with 15.5 Amps. Another retailer may propose Name Brand B with 19 Amps. And yet a third retailer may recommend Name Brand C with 21 Amps. To judge which vacuum cleaner best fits the customer's needs, he or she might want to consider additional information not contained in the proposals themselves, such as consumer ratings given to the different brands and the significance of the Amp values.

Figure 9:
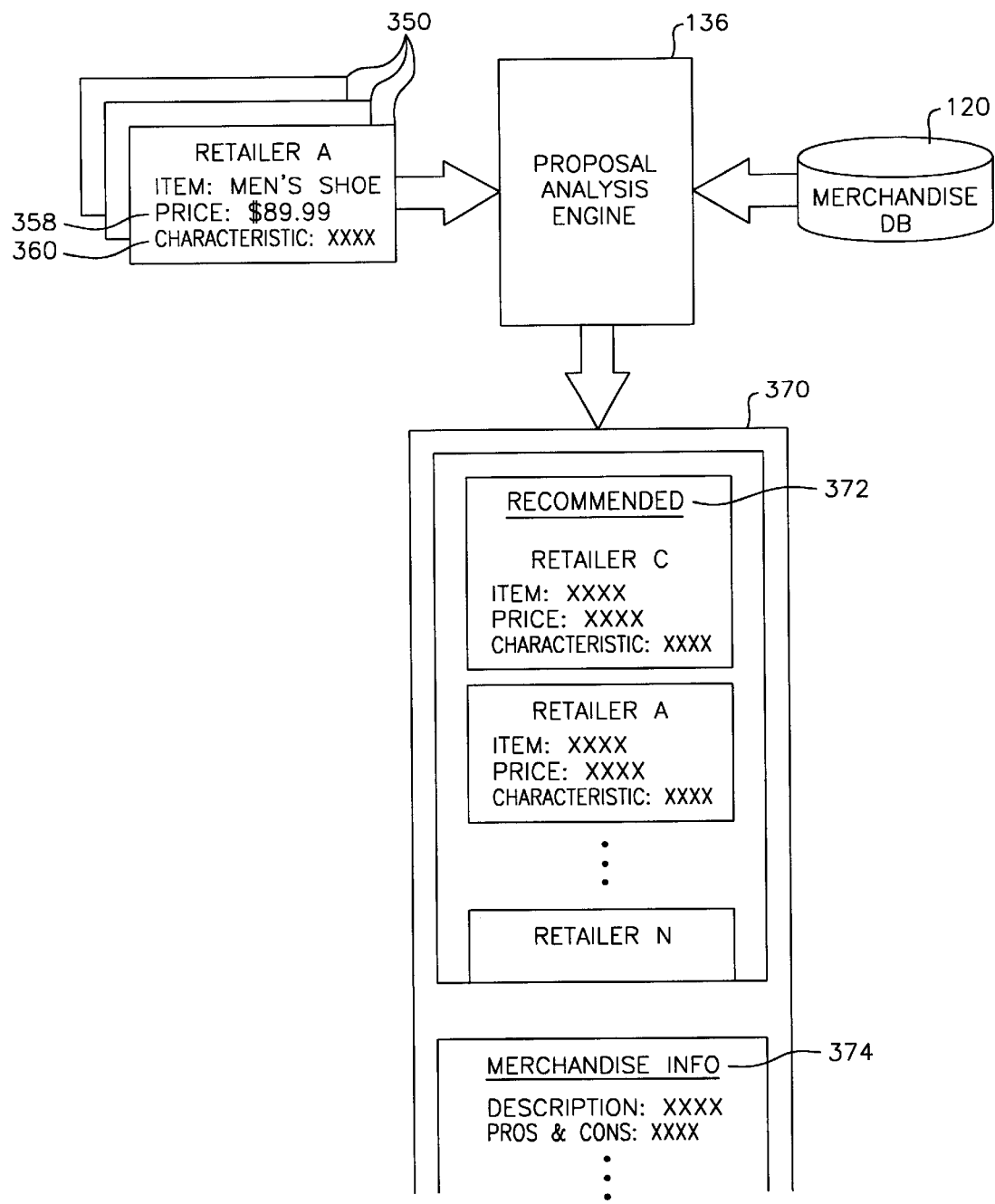
FIG. 9 is a functional diagram of a Proposal Analysis Engine for identifying a recommended retailer proposal.

Referring now to FIG. 9, the Proposal Analysis Engine 136 aides customers in the process of sorting through proposals by identifying one or more of the proposals as the recommended ones. The Engine 136 first compares information contained in the proposals 350, such as price 358 and characteristics 360 of the items, against each other. For instance, if two proposals propose the same item, with the only difference being in their price, the proposal with the lower item price might be identified as the one to recommend.

The Proposal Analysis Engine 136 further compares information in the proposals 350 with merchandise information in the Merchandise Information Database 120. During this routine, the Proposal Analysis Engine 136 searches the Merchandise Information Database 120 for products that are the same or similar to the items in the retailer proposals 350. Once the merchandise records 270 (FIG. 5) of such products are identified, the price 274, product description 276, and Pros and Cons area 278 are examined to determine which proposal to recommend.

In the vacuum cleaner example from above, the price 274 entry might provide information as to how the price of the vacuum cleaner proposed by a particular retailer compares with the market price reflected by the price entry 274. The product description 276 area might provide information as to the satisfaction rating given by consumers for the proposed vacuum cleaner, and might further explain the relationship between an Amp value and cleaning effectiveness.

After the proposals 350 have been analyzed, the Proposal Analysis Engine 136 selects one or more proposals for recommendation. The recommended proposal or proposals are bundled into a single record 370 with the remaining retailer proposals 350, and the record is submitted to the requesting customer along with appropriate merchandise information retrieved from the Merchandise Information Database 120.

According to the embodiment illustrated in FIG. 9, the recommended proposal is placed at the beginning of the record 370 with a "RECOMMENDED" header 372 preceding the text of the recommended proposal. The retrieved merchandise information 374 is appended to the end of the record. Depending on a particular customer's preference, the merchandise information 374 area might include non-repetitive merchandise information of only items in the recommended proposal or proposals. Alternatively, the merchandise information 374 area might include non-repetitive information of items in all the proposals submitted by the retailers.

Figure 10:
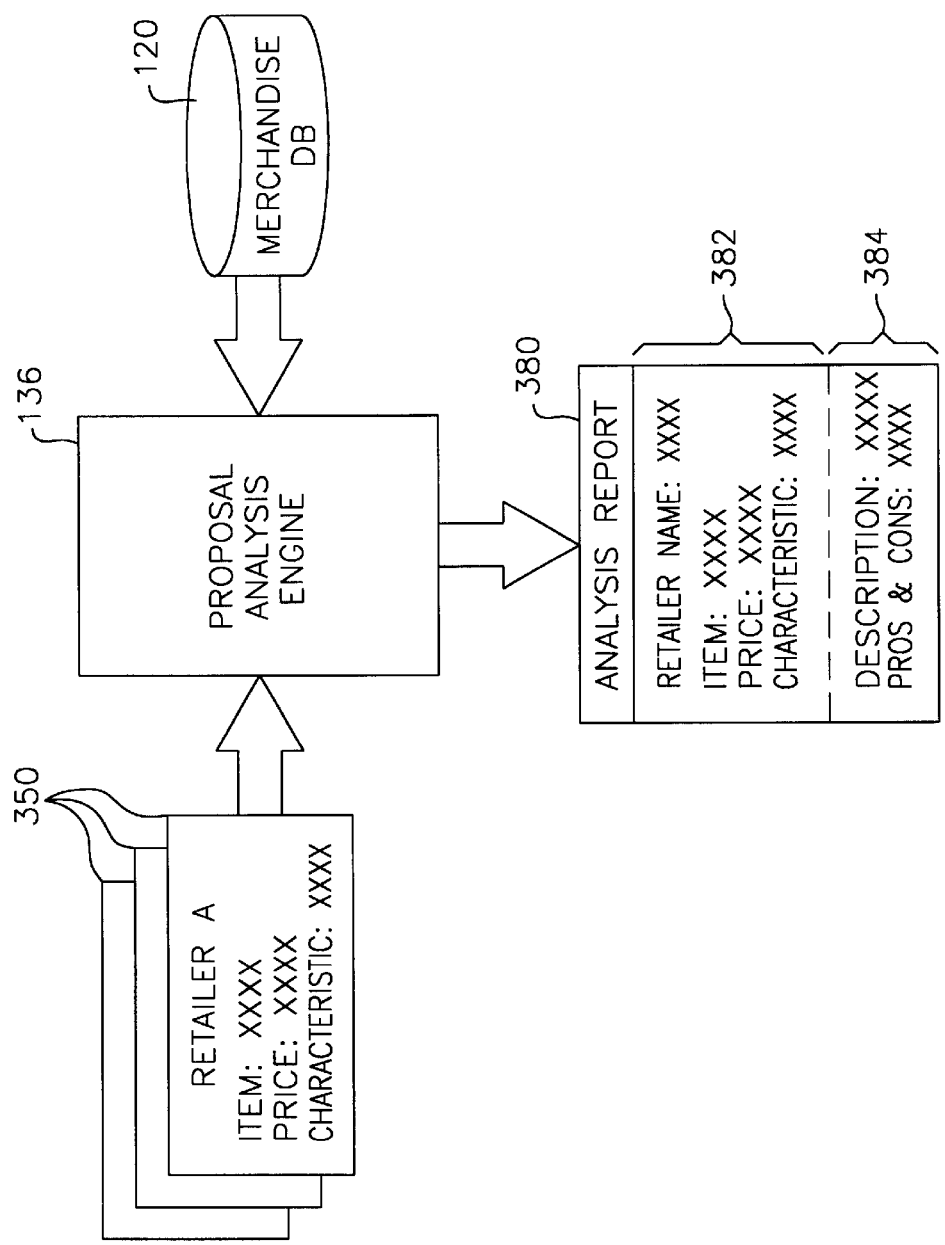
FIG. 10 is a functional diagram detailing the creation of an analysis report.
Figure 6:
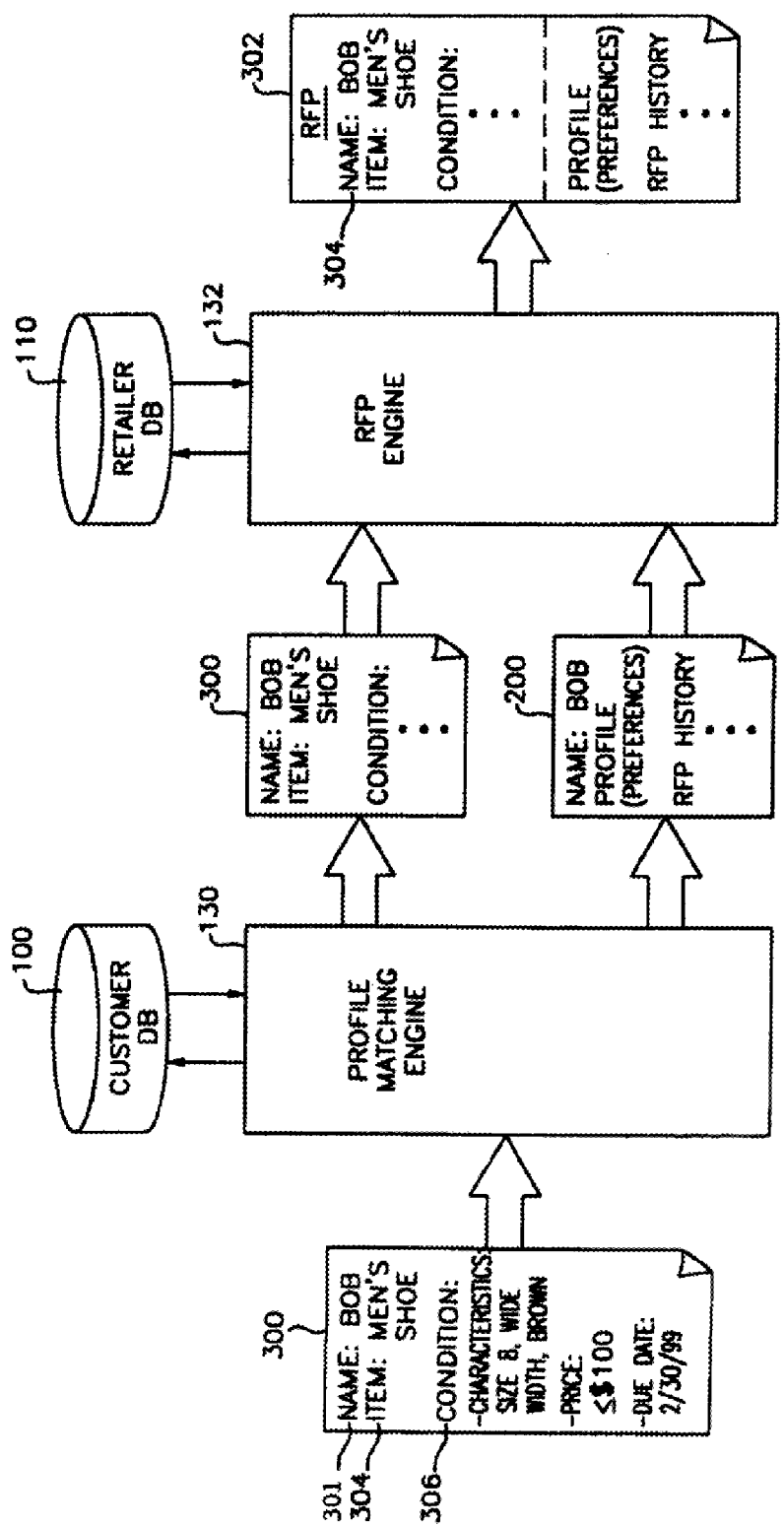

FIG. 10 is a functional diagram of the Proposal Analysis Engine 136 detailing an alternative method for separating a proposal to be recommended from the remaining proposals. According to this illustration, the Proposal Analysis Engine 136 generates a separate Analysis Report 380 which includes the proposal recommended 382 along with pertinent merchandise information 384. The Analysis Report 380 is then submitted along with the remaining proposals submitted by the retailers.

Once a customer receives the proposals 350 submitted by the retailers (with or without an analysis of those proposals), the customer might place an order for a merchandise described in one of the proposals electronically through the Internet. The customer might access the selected retailer's Web-site and place the order through the site. The customer might alternatively decide to visit the actual retailer or retailers and personally view or test the desired merchandise prior to purchase. In either scenario, the customer is spared from the daunting task of having to search for the retailers on the Internet with the hopes that the search will result in a list of retailers that will meet his or her needs and preferences.

Referring back to FIG. 2, according to an additional embodiment of the invention, the ESA 48 makes use of the customer profile data in the Customer Database 100 to provide market reports to the retailers through a Market Survey Engine 138. The Customer Database 100 is rich in information about consumer trends and preferences not generally available to retailers. Retailers, however, will benefit from such information if made available to them. For instance, knowledge of what consumers want may help improve marketing strategies. In addition, such knowledge will allow retailers to make products and provide services that will better satisfy consumer needs and desires.

In the described embodiment, the Market Survey Engine 138 searches the Customer Database 100 for customer records 200 (FIG. 3) containing profile information. The customer profile data in those records are related to the RFP history information 206 to determine how particular needs and interests relate to demographics, gender, and age. A market survey report is then created based on the analyzed data for submission to the retailers via any of the described communication means.

In one embodiment of the invention, market analysis is performed upon specific request by a retailer, manufacturer, or service organization. Alternatively, the retailers, manufacturers, or services organizations subscribed with the system receive market survey reports automatically on a periodic basis.

Accordingly, there has been brought to the art of electronic shopping systems, a system and method that allows identification of retailers that offer the merchandise and/or services sought by a customer through an interactive electronic shopping agent. The ESA receives customer requests and passes those requests to appropriate retailers along with the customer's profile data. With knowledge of the specific requirements of the customer as well as information as to who the customer is, a retailer is able to make more accurate recommendations of items and services that are more likely to satisfy the customer's needs and desires. It will be appreciated that an electronic shopping system in accordance with the various embodiments of the invention can be constructed in whole or in part either from special purpose-built hardware or from general purpose computer system components which are controlled by a suitable application program.

While the invention has been described with respect to particular illustrated embodiments, those skilled in the art and technology to which the invention pertains will have no difficulty devising variations which in no way depart from the scope and spirit of the present invention. For example, while the illustrated embodiments have been described in connection with retail stores, it will be appreciated that the present system and method may be devised for utilization in financial, security, insurance, educational, medical, lodging, travel institutions and the like. In addition, communication link or links employed between the ESA, customer terminals, and retailer terminals, may be a wired network configuration or wireless. Wireless communication between the ESA, customer terminals, and retailer terminals might be infrared as well as RF-based. Accordingly, the present invention is not limited to the specific embodiments described above, but rather, is defined by the scope of the appended claims.

What is claimed is:

1. An electronic shopping system comprising:
   a customer interface for enabling receipt of a customer-specific merchandise or service request;
   a customer database system for storing a plurality of customer records, each record including customer profile data and merchandise and service request history data for a plurality of past and present merchandise and service requests submitted by the customer;

a retailer database system for storing a plurality of retailer records, each record including retailer merchandise or service data;

an electronic shopping agent having access to the customer database system and the retailer database system, the electronic shopping agent being configured to locate a customer record corresponding to the requesting customer from the customer database system, and further being configured to identify a retailer from the retailer database system based on the received request, and generate a request for proposal based on the customer-specific merchandise or service request, customer profile data, and merchandise and service request history data;

means coupled to the electronic shopping agent for transmitting the request for proposal to a computer system of the identified retailer;

means for performing a search for a product or service based on the merchandise or service request, customer profile data, and merchandise and service request history data;

means coupled to the electronic shopping agent for receiving from the identified retailer, in response to the request for proposal, information on a product or service selected during the search;

means for updating the customer record in response to the receipt of information on the product or service; and means coupled to the electronic shopping agent for forwarding to the requesting customer the information on the product or service.

2. The electronic shopping system of claim 1, wherein the customer interface includes an Internet connection.

3. The electronic shopping system of claim 1, wherein the electronic shopping agent generates a market survey report from data in the customer database system.

4. The electronic shopping system of claim 1, wherein the electronic shopping agent provides privacy protection to the customer by deleting the identity of the customer when generating the merchandise or service request.

5. The electronic shopping system of claim 1 further comprising a merchandise information database system for storing a plurality of merchandise records, each record including merchandise or service data.

6. The electronic shopping system of claim 1, wherein each retailer record includes an information storage area for maintaining proposal history data for a plurality of matching products or services submitted by the retailer.

7. The electronic shopping system of claim 1, further comprising means for receiving information on a plurality of matching products or services from a plurality of identified retailers, the electronic shopping agent being configured to select a recommended product or service from the plurality of matching products or services for forwarding to the requesting customer.

8. The system of claim 1 further comprising a product database storing product or service information, wherein the electronic shopping agent is further configured to search the product database for additional information on the product or service and forward to the requesting customer the additional information along with the information received from the identified retailer on the product or service.

9. An electronic shopping agent having access to a customer database system and a retailer database system, the customer database system storing a plurality of customer records, and the retailer database system storing a plurality of retailer records including retailer merchandise or service data, the electronic shopping agent comprising:

means for receiving a customer-specific merchandise or service request;

means for locating a customer record corresponding to the requesting customer from the customer database system the customer record including customer profile data and merchandise and service request history data for a plurality of past and present merchandise and service requests submitted by the customer;

means for identifying a retailer from the retailer database system based on the received request;

means for generating a request for proposal based on the customer-specific merchandise or service request, customer profile data, and merchandise and service request history data;

means for transmitting the request for proposal to a computer system of the identified retailer;

means for performing a search for a product or service based on the merchandise or service request, customer profile data, and merchandise and service request history data;

means for receiving from the identified retailer, in response to the request for proposal, information on a product or service selected during the search;

means for updating the customer record in response to the receipt of information on the product or service; and means for forwarding to the requesting customer the information on the product or service.

10. The electronic shopping agent of claim 9 further comprising means for generating a market survey report from data in the customer database system.

11. The electronic shopping agent of claim 9 further comprising means for providing privacy protection to the customer by deleting the identity of the customer when generating the merchandise or service the request.

12. The electronic shopping agent of claim 9 further comprising:

means for receiving information on a plurality of matching products or services from a plurality of identified retailers; and means for selecting a recommended product or service from the plurality of matching products or services for forwarding to the requesting customer.

13. The electronic shopping agent of claim 12 further comprising a means for searching a product database for additional information on the product or service, wherein the means for forwarding forwards to the requesting customer the additional information along with the information received from the identified retailer on the product or service.

14. In an electronic shopping system including an electronic shopping agent with access to a customer database system and a retailer database system, the customer database system storing a plurality of customer records, and the retailer database system storing a plurality of retailer records including retailer merchandise or service data, a method of establishing communication between a customer and a retailer through the electronic shopping agent, the method comprising the, steps of:

receiving a customer-specific merchandise or service request;

locating a customer record corresponding to the requesting customer from the customer database system, the customer record including customer profile data and merchandise and service request history data for a plurality of past and present merchandise and service requests submitted by the customer;

identifying a retailer from the retailer database system based on the received request;

the electronic shopping agent generating a request for proposal based on the customer-specific merchandise or service request, customer profile data, and merchandise and service request history data;

transmitting the request for proposal to a computer system of the identified retailer;

performing at a retailer site a search for a product or service based on the merchandise or service request, customer profile data, and merchandise and service request history data;

receiving from the identified retailer, in response to the request for proposal, information on a product or service selected during the search;

updating the customer record in response to the receipt of information on the product or service; and forwarding to the requesting customer the information on the product or service.

15. The method of claim 14 further comprising the step of generating a market survey report from data in the customer database system.

16. The method of claim 14 further comprising the step of providing privacy protection to the customer by deleting the identity of the customer when generating the merchandise or service request.

17. The method of claim 14 further comprising the steps of:

receiving information on a plurality of matching products or services from a plurality of identified retailers; and selecting a recommended product or service from the plurality of matching products or services for forwarding to the requesting customer.

18. The method of claim 14 further comprising:

searching a product database for additional information on the product or service; and forwarding to the requesting customer the additional information along with the information received from the identified retailer on the product or service.

* * * * *

UNITED STATES PATENT AND TRADEMARK OFFICE
CERTIFICATE OF CORRECTION

PATENT NO.       : 6,868,392 B1
APPLICATION NO.  : 09/350818
DATED            : March 15, 2005
INVENTOR(S)      : Nobuo Ogasawara It is certified that error appears in the above-identified patent and that said Letters Patent is hereby corrected as shown below:

In the Figures:

Delete Drawing Sheet 6, and substitute therefore the Drawing Sheet, consisting of Fig. 6, as shown on the attached page.

In the claims:

Column 14, line 37, delete "service the" insert --service--
Column 14, line 46, delete "claim 12" insert --claim 9--

Signed and Sealed this

Twenty Second Day of April, 2008

JON W. DUDAS
*Director of the United States Patent and Trademark Office*